(12) United States Patent
Lee et al.

(10) Patent No.: US 9,056,939 B2
(45) Date of Patent: Jun. 16, 2015

(54) OLEFIN BLOCK COPOLYMER

(75) Inventors: Yong-Ho Lee, Incheon (KR);
Man-Seong Jeon, Daejeon (KR);
Jeong-Min Kim, Daejeon (KR);
Heon-Yong Kwon, Daejeon (KR);
Min-Seok Cho, Daejeon (KR);
Seon-Kyoung Kim, Daejeon (KR);
Dae-Sik Hong, Gunpo-si (KR); Ki-Soo Lee, Daejeon (KR); Kyoung-Chan Lim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/980,741

(22) PCT Filed: Jan. 27, 2012

(86) PCT No.: PCT/KR2012/000636
§ 371 (c)(1),
(2), (4) Date: Jul. 19, 2013

(87) PCT Pub. No.: WO2010/102575
PCT Pub. Date: Aug. 2, 2012

(65) Prior Publication Data
US 2013/0296519 A1    Nov. 7, 2013

(30) Foreign Application Priority Data

Jan. 27, 2011    (KR) .................. 10-2011-0008445
Jan. 28, 2011    (KR) .................. 10-2011-0009064

(51) Int. Cl.
| | | |
|---|---|---|
| C08F 210/16 | (2006.01) | |
| C08F 210/06 | (2006.01) | |
| C08F 297/08 | (2006.01) | |
| C08F 297/06 | (2006.01) | |
| C08F 4/6392 | (2006.01) | |
| C08F 4/6592 | (2006.01) | |
| C08F 210/14 | (2006.01) | |
| C08F 210/08 | (2006.01) | |
| C08L 23/16 | (2006.01) | |

(52) U.S. Cl.
CPC ............. *C08F 297/06* (2013.01); *C08F 210/06* (2013.01); *C08F 4/63927* (2013.01); *C08F 4/65927* (2013.01); *C08F 297/083* (2013.01); *C08F 210/14* (2013.01); *C08F 210/08* (2013.01); *C08F 210/16* (2013.01); *C08F 297/08* (2013.01); *C08L 23/16* (2013.01)

(58) Field of Classification Search
CPC .... C08F 210/06; C08F 210/08; C08F 210/14; C08F 210/16; C08F 297/06; C08F 297/08; C08F 297/083; C08F 4/63927; C08F 4/65927
USPC ......... 526/348, 348.2, 348.5, 348.6, 160, 170
See application file for complete search history.

(56) References Cited

U.S. PATENT DOCUMENTS

| | | |
|---|---|---|
| 2011/0032621 A1 | 2/2011 | Marchand et al. |
| 2012/0123078 A1 * | 5/2012 | Lee et al. ................ 526/348 |

FOREIGN PATENT DOCUMENTS

| | | |
|---|---|---|
| CN | 102574885 A | 7/2012 |
| EP | 2460809 A2 | 6/2012 |
| JP | 2008-545016 A | 12/2008 |
| JP | 2010-275443 A | 12/2010 |
| JP | 2011-511139 A | 4/2011 |
| JP | 2013-500331 A | 1/2013 |
| KR | 10-2010-0041818 A | 4/2010 |
| KR | 10-2010-0107510 A | 10/2010 |
| KR | 10-2010-0115780 A | 10/2010 |
| KR | 10-2010-0134571 A | 12/2010 |
| WO | 2009/012073 A2 | 1/2009 |
| WO | 2009/097529 A1 | 8/2009 |
| WO | 2009/097560 A1 | 8/2009 |
| WO | WO 2009/097565 A1 * | 8/2009 |
| WO | WO 2011/014022 A2 * | 2/2011 |

* cited by examiner

*Primary Examiner* — Roberto Rabago
(74) *Attorney, Agent, or Firm* — McKenna Long & Aldridge LLP

(57) ABSTRACT

The present description relates to an olefin block copolymer with enhanced processability as well as excellences in elasticity and heat resistance, and a preparation method for the same. The olefin block copolymer includes first and second segments, each containing an ethylene or propylene repeating unit and an α-olefin repeating unit at different mole fractions, where the second segment is dispersed in the form of a closed curve as a dispersed phase on the first segment according to a TEM (Transmission Electron Microscope) image.

11 Claims, 3 Drawing Sheets

OLEFIN BLOCK COPOLYMER

This application is a national stage entry of International Application No. PCT/KR2012/000636, filed on Jan. 27, 2012, which claims priority to Korean Patent Application Nos. 10-2011-0008445, filed on Jan. 27, 2011, and 10-2011-0009064, filed on Jan. 28, 2011, with the Korean Patent Office, all of which are incorporated herein in their entirety by reference.

TECHNICAL FIELD

The present description relates to an olefin block copolymer.

BACKGROUND

A block copolymer refers to a copolymer containing a plurality of blocks or segments of repeating units distinct in characteristics from one another. It tends to be superior in its properties to typical random copolymers or polymer blends. For example, the block copolymer may include both of soft elastic blocks (referred to as "soft segments") and hard crystalline blocks (referred to as "hard segments,") and thus have good properties, such as excellent elasticity and heat resistance. More specifically, such a block copolymer has elasticity at a temperature equal to or higher than the glass transition temperature of the soft segments and shows a thermoplastic behavior at a temperature above the melting temperature, consequently with relatively good heat resistance.

For specific examples of the block copolymer, SBS (styrene-butadiene-styrene) triblock copolymers and their hydrogenated versions (e.g., SEBS) are known for their usefulness in a variety of applications since they have good characteristics regarding heat resistance and elasticity.

Recently, the use of olefin-based elastomers, which are a copolymer of ethylene/propylene and α-olefin, has been intensively under consideration. More specifically, many attempts have been made to use the olefin-based elastomers in a variety of applications, such as for use purposes as a substitute for rubber materials. For further improvement on the heat resistance of the olefin-based elastomers, there has been an attempt to use block copolymer type elastomers in place of the conventional random copolymer type olefin-based elastomers such as ethylene-α-olefin random copolymers. Furthermore, many different approaches have been considered to prepare block copolymer type olefin-based elastomers with good processability in a simple production process.

SUMMARY

The present description provides an olefin block copolymer with enhanced processability in addition to good elasticity and heat resistance, and its preparation method.

In accordance with an embodiment of the present description, there is provided an olefin block copolymer comprising first and second segments, each comprising an ethylene or propylene repeating unit and an α-olefin repeating unit at different mole fractions, where the second segment is dispersed in the form of a closed curve as a dispersed phase on the first segment according to a TEM (Transmission Electron Microscope) image.

In the TEM image of the olefin block copolymer, the dispersed phase of the second segment shaped in the form of a closed curve may have a diameter of about 0.3 to 2.0 μm such as, for example, about 0.3 to 1.9 μm, about 0.4 to 1.8 μm, about 0.5 to 1.5 μm, or about 0.5 to 1.3 μm.

In the olefin block copolymer, the first segment is a hard segment comprising a first mole fraction of the α-olefin repeating unit, and the second segment is a soft segment comprising a second mole fraction of the α-olefin repeating unit, where the second mole fraction is greater than the first mole fraction. In this regard, the mole fraction of the α-olefin repeating unit contained in the entire block copolymer may have a value between the first and second mole fractions.

In the olefin block copolymer according to one exemplary embodiment, the mole fraction Y (mol. %) of the hard segment and the mole fraction X (mol. %) of the ethylene or propylene repeating unit in the entire block copolymer may satisfy the following Mathematical Formula 1. According to one example, the olefin block copolymer comprises 80 to 98 mol. % of the ethylene or propylene repeating unit and a remaining content of the α-olefin repeating unit, satisfying the Mathematical Formula 1 in the entire content range of the ethylene or propylene repeating unit.

$$(Y-100) \geq 6(X-100) \qquad \text{[Mathematical Formula 1]}$$

Further, the olefin block copolymer may comprise 20 to 95 mol. % of the hard segment and 5 to 80 mol. % of the soft segment. The hard segment may have a higher value than the soft segment in at least one property of the degree of crystallization, density, and melting temperature.

Further, the olefin block copolymer may have a crystallization temperature Tc of about 95 to 120° C. and a melting temperature Tm of about 110 to 135° C.

The olefin block copolymer according to one exemplary embodiment may have a density of about 0.85 to 0.92 g/cm³. Further, the olefin block copolymer may have a weight average molecular weight of 5,000 to 3,000,000 and a molecular weight distribution of 2.5 to 6.

In the olefin block copolymer, the α-olefin repeating unit may be a repeating unit derived from at least one α-olefin selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

In accordance with another embodiment of the present description, there is provided an olefin block copolymer comprising first and second segments, each comprising an ethylene or propylene repeating unit and an α-olefin repeating unit at different mole fractions, where the first segment comprises a higher mole fraction of the ethylene or propylene repeating unit than the second segment. The mole fraction Y (mol. %) of the first segment and the mole fraction X (mol. %) of the ethylene or propylene repeating unit in the entire block copolymer satisfy Mathematical Formula 1 as follows:

$$(Y-100) \geq 6(X-100) \qquad \text{[Mathematical Formula 1]}$$

According to one example, the olefin block copolymer may comprise about 80 to 98 mol. % of the ethylene or propylene repeating unit and a remaining content of the α-olefin repeating unit, satisfying the Mathematical Formula 1 in the entire content range of the ethylene or propylene repeating unit.

The present description can provide an olefin block copolymer that exhibits good processability as well as excellences in heat resistance and elasticity. Particularly, such an olefin block copolymer can be prepared through a simple process using a simplified catalyst system.

Therefore, the olefin block copolymer contributes to the commercialization of olefin-based elastomers with excellences in heat resistance and other general properties, and such olefin-based elastomers can be properly used as a substitute for rubber materials in a wide range of applications.

DETAILED DESCRIPTION OF THE EMBODIMENTS

Figure 1:
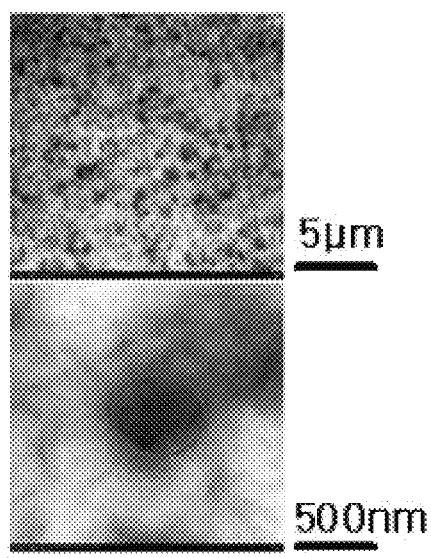
FIG. 1 shows TEM images of an olefin block copolymer according to Example 1, where the lower image is an enlargement of the dispersed phase shaped in a closed curve shown in the upper image.

Hereinafter, a detailed description will be given as to the olefin block copolymer and its preparation method according to the embodiments of the present description. However, these embodiments are provided as a mere illustration and not intended to limit the scope of the invention. Moreover, it is apparent to those skilled in the art that the embodiments may be modified in many ways.

Unless stated otherwise, some terms as used in the entire specification may be defined as follows.

The term "(olefin) block copolymer" as used herein refers to a copolymer of ethylene or propylene and α-olefin, which copolymer comprises a plurality of blocks or segments of repeating units that are distinguishable from one another in terms of at least one physical or chemical property, such as, for example, the content (mole fraction) of the ethylene- or propylene-derived repeating unit, the content (mole fraction) of the α-olefin-derived repeating unit, the degree of crystallization, density, or melting temperature.

A plurality of the blocks or segments may be first and second segments, each comprising, for example, an ethylene or propylene repeating unit and an α-olefin repeating unit, on the condition that the contents (mole fractions) of the repeating units are different from each other. For example, the first segment may be a hard segment which is a hard crystalline block comprising a first mole fraction of the α-olefin repeating unit, while the second segment may be a soft segment which is a soft elastic block comprising a second mole fraction of the α-olefin repeating unit. Here, the second mole fraction is greater than the first mole fraction. As a result of the contents of the α-olefin repeating unit, the first segment to be the hard segment may comprise a higher mole fraction of the ethylene or propylene repeating unit than the first segment to be the soft segment. Further, the first mole fraction may be lower than the mole fraction of the α-olefin repeating unit as measured for the entire block copolymer, while the second mole fraction may be higher than the mole fraction of the α-olefin repeating unit for the entire block copolymer.

In addition, the plural blocks or segments may be distinguishable from one another in terms of at least one property of the degree of crystallization, density, and melting temperature. In comparison with the soft segment that is a soft elastic block, for example, the hard segment that is a hard crystalline block may have a higher value in terms of at least one or two properties of the degree of crystallization, density, and melting temperature.

The olefin block copolymer of an exemplary embodiment in the present description may also be defined by the aftermentioned segment dispersion characteristics analyzed by a defined TEM image in addition to the aforementioned properties, such as the mole fraction of the ethylene or propylene repeating unit, the mole fraction of the α-olefin repeating unit, the degree of crystallization, density, or meting temperature.

The olefin block copolymer of the exemplary embodiment may comprise first and second segments, each containing an ethylene or propylene repeating unit and a α-olefin repeating unit at different mole fractions. Further, according to a TEM (Transmission Electron Microscope) image of the olefin block copolymer, the second segment is dispersed in the form of a closed curve as a dispersed phase on the first segment.

The olefin block copolymer of the embodiment is prepared by copolymerization of ethylene or propylene with α-olefin, so it contains an ethylene- or propylene-derived repeating unit and an α-olefin-derived repeating unit and thus benefits from the inclusion of the α-olefin repeating unit derived from α-olefin to have good elasticity.

As the olefin block copolymer is prepared using the aftermentioned catalyst system, it may be a block copolymer including a plurality of blocks or segments such as, for example, first and second segments, each containing the ethylene or propylene repeating unit and the α-olefin repeating unit at different mole fractions. More specifically, the first segment may be a hard segment that is a hard crystalline block containing a first mole fraction of the α-olefin repeating unit, and the second segment may be a soft segment that is a soft elastic block containing a second mole fraction of the α-olefin repeating unit. Here, the second mole fraction is greater than the first mole fraction. The first and second segments may contain a remaining mole fraction of the ethylene or propylene repeating unit other than the mole fraction of the α-olefin repeating unit. Accordingly, the first segment to be the hard segment contains a higher mole fraction of the ethylene or propylene repeating unit than the second segment to be the soft segment. Further, the mole fraction of the α-olefin repeating unit included in the entire block copolymer may have a value between the first and second mole fractions. In other words, the first mole fraction of the α-olefin repeating unit included in the first segment is lower than the mole fraction of the α-olefin repeating unit calculated for the entire block copolymer, while the second mole fraction of the α-olefin repeating unit in the second segment is higher than the mole fraction of the α-olefin repeating unit calculated for the entire block copolymer.

In this manner, the olefin block copolymer of the embodiment has a blocked form comprising a plurality of blocks or segments. As the block copolymer of the embodiment comprises the first segment (i.e., hard segment) that is a hard crystalline block having a relatively high mole fraction of the ethylene or propylene repeating unit, for example, it has a high melting temperature up to about 110 to 135° C., about 115 to 130° C., or about 115 to 125° C., which is higher than the melting temperature of the conventional random copolymer type olefin-based elastomers. Thus, the block copolymer of the embodiment may show enhanced heat resistance and good elasticity as an elastomer even at higher temperature, in comparison with the conventional olefin-based elastomers such as ethylene-α-olefin random copolymers.

A plurality of blocks or segments, such as the first and second segments (i.e., hard and soft segments) contained in the block copolymer of the embodiment are distinguishable from one another by at least one of the properties including the degree of crystallization, density, or melting temperature. For example, the hard segment that is a hard crystalline block containing a relatively high mole fraction of an ethylene or propylene repeating unit may have a relatively high value in at least one of the properties, such as the degree of crystallization, density, and melting temperature, with respect to the soft segment that is a soft elastic block containing a relatively high mole fraction of the α-olefin repeating unit. This presumably results from the higher crystallinity of the hard segment. These properties of each block or segment can be determined and/or identified by preparing a (co)polymer corresponding to each block or segment and measuring the properties concerned.

As the block copolymer of the embodiment includes a plurality of blocks or segments distinct from one another in their properties, it can exhibit good heat resistance as well as excellent elasticity. For example, the block copolymer not only has excellent elasticity as a benefit from the inclusion of the soft segment that is a soft elastic block but maintains good properties such as high melting temperature and excellent elasticity due to inclusion of the hard segment that is a crystalline block having a relatively high melting temperature. This renders the block copolymer to have good heat resistance.

On the other hand, the block copolymer of the embodiment may have segment dispersion characteristics as analyzed by a defined TEM image. More specifically, an image of the block copolymer shot on TEM shows that the first segment as a hard segment takes the form of a matrix, while the second segment as a soft segment is dispersed in the form of a closed curve as a dispersed phase on the first segment. An exemplary TEM image with such a dispersion characteristic is shown in FIG. 1. Referring to FIG. 1, the dispersed phase of the second segment in a relatively dark color is uniformly dispersed in the form of a closed curve on the matrix of the first segment in a relatively light color. In this regard, the closed curve implies that the dispersed phase of the second segment is shaped in circular, elliptical, or similar form, that is, a curve enclosing a defined area, rather than a linear form or a radial form consisting of multiple lines.

The size of the dispersed phase can be defined by the size of the closed curve (e.g., the size of the red circle in FIG. 1), which is definitely distinguishable from the surrounding matrix phase in brightness. For example, the size of the dispersed phase is defined by the "diameter" that is the length of the longest straight line going from an outermost point on the one side of the closed curve, through the center, to an outermost point on the other side (e.g., the length of the longest straight line between any two points on the dotted circle of FIG. 1). In the block copolymer of the embodiment, the dispersed phase shaped in a closed curve may have a diameter of about 0.3 to 2.0 μm, about 0.3 to 1.9 μm, about 0.4 to 1.8 μm, about 0.5 to 1.5 μm, or about 0.5 to 1.3 μm. To determine the diameter of the dispersed phase shaped in a closed curve, for example, a bar-, sheet- or film-shaped sample of the block copolymer is examined with a TEM to obtain a TEM image and visually measure the diameter of the dispersed phase in consideration of the magnification or to automatically calculate the diameter from the TEM. For precision of the diameter measurement, the diameter of the closed curve is determined as the average value of X diameter values measured from the TEM image (for example, the average of the diameters of approximately 5 to 30 dispersed phases each shaped in a closed curve. For TEM examination, the sample of the block copolymer can be chemically treated in an appropriate manner. For example, the sample prior to TEM observation is vapor-stained with a 1M aqueous solution of magnesium sulfate for one hour or dissolved and heated up to about 100° C. in TEM (Reference: *Microscopy and Microanalysis* 14 (126-137, 2008).

The above-described dispersion characteristics according to the TEM image implicitly show the high degree of blocking and/or the crystal properties peculiar to the block copolymer of the embodiment. As can be seen from the dispersion characteristics, the block copolymer comprises hard and soft segments definitely distinct from each other and has a considerable content of the hard segment that is a matrix phase, so it can exhibit a high degree of blocking, consequently with a high melting temperature and a good heat resistance. Further, the uniform dispersion of the soft segment as a dispersed phase shaped in a closed curve on the hard segment implicitly shows the crystal properties peculiar to the block copolymer. Accordingly, the block copolymer of the embodiment has a defined range of high crystallization temperature Tc, such as, for example, about 95 to 120° C., about 100 to 115° C., or about 102 to 110° C.

As the block copolymer of the embodiment has such unique crystal properties and high crystallization temperature, faster crystallization occurs after melting during the melt processing of the block copolymer to ensure a rapid molding. Thus, the block copolymer of the embodiment can be excellent in processability and formability. Particularly, the aforementioned dispersion characteristics and the resultant crystal properties as shown on the TEM image correspond to the novel characteristics of the block copolymer newly discovered in the present description. As can be seen from the after-mentioned Examples, the block copolymer of the embodiment with such novel dispersion characteristics is fast in crystallization and processing after being melted, consequently with excellent formability.

On the other hand, the block copolymer of the embodiment can be characterized by that the mole fraction Y (mol. %) of the hard segment (i.e., the first segment) and the mole fraction X (mol. %) of the ethylene or propylene repeating unit in the entire block copolymer satisfy the following Mathematical Formula 1:

$$(Y-100) \geq 6(X-100) \quad \text{[Mathematical Formula 1]}$$

For example, the block copolymer may have the mole fraction Y (mol. %) of the hard segment and the mole fraction X (mol. %) of the ethylene or propylene repeating unit satisfy the following Mathematical Formula 1a. It is revealed that one specific example of the block copolymer meets the equation given by Y=3.7435X−283.37 ($R^2$=0.8176) (Refer to the following Examples).

$$3(X-100) \geq (Y-100) \geq 6(X-100) \quad \text{[Mathematical Formula 1a]}$$

Such characteristics mean that the block copolymer has a relatively high content of the hard segment even when a same amount of ethylene or propylene is used to copolymerize. It implicitly shows that the monomers having a relatively higher content of ethylene or propylene undergo polymerization and coupling to form the hard segment (i.e., the first segment), while the monomers having a relatively higher content of α-olefin undergo polymerization and coupling to form the soft segment (i.e., the second segment). As a result, the block copolymer can have a higher degree of blocking than the conventional olefin-based elastomers. Such a higher degree of blocking renders the block copolymer of the embodiment to exhibit more enhanced heat resistance.

In the Mathematical Formula 1, the mole fraction Y (mol. %) of the hard segment and the mole fraction X (mol. %) of the ethylene or propylene repeating unit can be measured by the respective measurement methods as given below, and the results of the measurement are used to determine the characteristics corresponding to the Mathematical Formula 1 through linear regression analysis.

Firstly, the mole fraction Y (mol. %) of the hard segment can be calculated with a time domain NMR (TD NMR) instrument commercially available. More specifically, the TD NMR instrument is used to determine the free induction decay (FID) for a sample of the block copolymer, where the FID is expressed as a function of time and intensity. According to the following Mathematical Formula 2, four constants, A, B, $T2_{fast}$, and $T2_{slow}$ are varied to elicit a functional formula most approximating the graph of the above-mentioned FID function and thereby to determine the values of A, B, $T2_{fast}$, and $T2_{slow}$ for the sample. For reference, the T2 (spin-spin relaxation time) relaxation for the hard segment as calculated from the functional formula appears fast, while the T2 relaxation for the soft segment is slow. Hence, among the calculated values of A, B, $T2_{fast}$, and $T2_{slow}$, the lower T2 value is determined as the T2 value of the hard segment, that is, $T2_{fast}$, while the higher T2 value is determined as the T2 value of the soft segment, that is, $T2_{slow}$. This process enables it to calculate the mole fraction (mol. %) of the hard segment as well as the constants A and B.

$$\text{Intensity} = A \times \text{EXP}(-\text{Time}/T2_{fast}) + B \times \text{EXP}(-\text{Time}/T2_{slow})$$ [Mathematical Formula 2]

Determine A, B, $T2_{fast}$, and $T2_{slow}$ by fitting.

Hard segment(mol. %)=A/(A+B)×100

In the Mathematical Formula 2, intensity and time are values calculated through the FID analysis; $T2_{fast}$ is the T2 (spin-spin relaxation time) relaxation value for the hard segment; and $T2_{slow}$ is the T2 (spin-spin relaxation time) relaxation value for the soft segment. A and B, which are constants determined by the fitting process, indicate the relative proportions of the hard and soft segments, respectively, and have values proportionate to the contents of the respective segments.

The mole fraction X (mol. %) of the ethylene or propylene repeating unit contained in the block copolymer can be determined in consideration of the content of the ethylene or propylene monomer used in the copolymerization, or calculated through $^1$H-NMR or $^{13}$C-NMR analysis of the block copolymer. For example, the mole fraction of the ethylene repeating unit can be determined through a $^1$H-NMR analysis on the block copolymer to quantitatively analyze the peaks for the methyl groups appearing at around 0.9 ppm in the spectrum, or a $^{13}$C-NMR analysis of the block copolymer. The mole fraction of the propylene repeating unit can be determined through a $^1$H-NMR or $^{13}$C-NMR analysis of the block copolymer. In analyzing and calculating the mole fraction of each repeating unit by a $^{13}$C-NMR analysis of the block copolymer, for example, the block copolymer containing an ethylene or propylene repeating unit and an α-olefin repeating unit such as 1-hexene is subjected to $^{13}$C-NMR analysis to quantitatively analyze the terminal carbon peaks or the tertiary carbon (methane carbon) peaks of a methyl or butyl branch, thereby determining the mole fraction of the ethylene or propylene repeating unit or the α-olefin repeating unit.

For a plurality of block copolymers prepared by using different amounts of the ethylene or propylene monomer under the same polymerization conditions, the aforementioned methods are adopted to measure the mole fraction Y (mol. %) of the hard segment and the mole fraction X (mol. %) of the ethylene or propylene repeating unit and elicit the relationship between the two mole fractions X and Y. An exemplary illustration showing the relationship between X and Y is presented in FIG. 4. The relationship between X and Y is used to acquire a relational formula corresponding to the Mathematical Formula 1 through linear regression analysis and to determine whether the copolymer satisfies the Mathematical Formula 1.

In a more specific example, the block copolymer of the embodiment may comprise about 80 to 98 mol. %, about 80 to 93 mol. %, or about 85 to 95 mol. % of the ethylene or propylene repeating unit. The block copolymer may also comprise a remaining content (i.e., about 2 to 20 mol. %, about 7 to 20 mol. %, or about 5 to 15 mol. %) of the α-olefin repeating unit in addition to the above-defined mole fraction of the ethylene or propylene repeating unit. The block copolymer contains the above-defined mole fraction of the α-olefin repeating unit to have good elasticity and also has the mole fraction of the ethylene or propylene repeating unit optimized to ensure high melting temperature and good heat resistance.

In addition, the block copolymer of the embodiment does not fail to satisfy the relationship as defined by the Mathematical Formula 1 in the entire content range of the repeating units. As a result, the block copolymer can exhibit a higher degree of blocking and thus good heat resistance in the entire range where it substantially has characteristics as an elastomer.

The block copolymer may comprise about 20 to 95 mol. %, about 25 to 90 mol. %, or about 20 to 85 mol. % of the hard segment and a remaining mole fraction (i.e., about 5 to 80 mol. %, about 10 to 75 mol. %, or about 15 to 80 mol. %) of the soft segment.

As described above, among a plurality of blocks or segments contained in the block copolymer, the hard segment means a hard crystalline segment having a relatively high mole fraction of the ethylene or propylene repeating unit, while the soft segment means a soft elastic segment having a relatively high mole fraction of the α-olefin repeating unit. As the block copolymer of the embodiment comprises the hard and soft segments in the defined mole fraction range, it can exhibit high melting temperature and good heat resistance pertaining to the hard segment as well as excellent elasticity caused by the soft segment.

The block copolymer of the embodiment may have a density of about 0.85 to 0.92 g/cm$^3$, about 0.86 to 0.90 g/cm$^3$, or about 0.86 to 0.91 g/cm$^3$ and a weight average molecular weight of about 5,000 to 3,000,000, about 10,000 to 1,000,000, or about 50,000 to 200,000. Further, the block copolymer may have a molecular weight distribution (MWD; Mw/Mn) of about 2.5 to 6, about 2.6 to 5, or about 2.5 to 3.5. As the block copolymer of the embodiment has such properties of density, molecular weight, or the like, it can show appropriate properties as an elastomer, good mechanical properties and high processability. Particularly, such a high molecular weight distribution of 2.5 or greater may render the block copolymer of the embodiment to have good processability.

The block copolymer may comprise an α-olefin repeating unit in addition to an ethylene or propylene repeating unit. In this regard, the α-olefin repeating unit may be a repeating unit derived from α-olefins, such as 1-butene, 1-pentene, 4-methyl-1-pentene, 1-hexene, 1-heptene, 1-octene, 1-decene, 1-undecene, 1-dodecene, 1-tetradecene, 1-hexadecene, or 1-itocene; or a repeating unit derived from at least two α-olefins selected from those listed above.

The olefin block copolymer of the embodiment may benefit from the inclusion of the α-olefin repeating unit to have good elasticity and exhibit good heat resistance as a consequence of its high degree of blocking. Further, the olefin block copolymer of the embodiment may have the novel dispersion characteristics determined by the TEM image, crystal properties, and higher crystallization temperature. Such characteristics of the block copolymer of the embodiment lead to fast crystallization of the block copolymer during the melt processing and thus ensure a higher rate of melt processing and more excellence in processability and formability. Therefore, the block copolymer of the embodiment can be used in a wider range of applications requiring heat resistance, overcoming the limitations of olefin-based elastomers in regards to the range of applications.

The block copolymer of the embodiment may be used substantially in all the applications in which the conventional elastomers have been adopted. Moreover, the block copolymer of the embodiment can be used in a wider range of applications in which the conventional olefin-based elastomers are substantially not adopted because of their poor heat resistance but, instead, the rubber materials have been used as a substitute for the olefin-based elastomers. For example, the block copolymer of the embodiment is used to form different kinds of products, including automobile parts or interior materials, such as bumpers, trimming parts, etc.; packaging materials; insulating materials; household products, such as shoe soles, toothbrush grips, flooring materials, knobs, etc.; adhesives, such as pressure-sensitive adhesives, hot melting adhesives, etc.; hoses; pipes; and so forth and adopted in a variety of other applications and uses.

The block copolymer of the embodiment may be used alone or in combination with other polymers, resins, or any kind of additives and used in any form of films, molded bodies, or fibers.

On the other hand, the above-described block copolymer may be prepared by copolymerization of ethylene or propylene with α-olefin in the presence of a defined catalyst composition. Such a preparation method for the olefin block copolymer may include copolymerizing ethylene or propylene with α-olefin at about 70 to 150° C. in the presence of a catalyst composition comprising a metallocene catalyst having a Group IV transition metal and a Lewis basic functional group, and a cocatalyst having a Lewis acidic element and an organic functional group. Particularly, in the preparation method, the metallocene catalyst and the cocatalyst under the above-defined copolymerization temperature conditions takes alternately a first state where the Lewis basic functional group and the Lewis acid element form an acid-base bond and a second state where the metallocene catalyst and the cocatalyst has no interaction with each other. Further, in the first state, the Group IV transition metal of the metallocene catalyst interacts with the organic functional group of the cocatalyst.

It can be predicted that the copolymerization of ethylene or propylene with α-olefin in the presence of such a characteristic catalyst composition comprising the metallocene catalyst and the cocatalyst leads to production of the block copolymer of the embodiment presumably accordingly to the following technical mechanism.

The metallocene catalyst contains a Group IV transition metal as a metal center and a Lewis basic functional group having noncovalent electron pairs (e.g., an oxygen-, nitrogen-, or sulfur-containing functional group), while the cocatalyst contains an organic functional group as well as a Lewis acidic element capable of forming a bond with noncovalent electron pairs (e.g., aluminum or boron). In the case of using the two-component catalyst system having the metallocene catalyst and the cocatalyst in a polymerization system, the catalyst and the cocatalyst at the polymerization temperature may take the first state, so the Lewis basic functional group and the Lewis acidic element form an acid-base bond and there occurs an interaction between the Group IV transition metal of the metallocene catalyst and the organic functional group of the cocatalyst. Alternatively, the catalyst and the cocatalyst may take the second state that there occurs no interaction between the metallocene catalyst and the cocatalyst (for example, the Lewis basic functional group and the Lewis acidic element do not form an acid-base bond; or there occurs no interaction between the Group IV transition metal and the organic functional group. Particularly, the catalyst and the cocatalyst at the polymerization temperature may take the first and second states alternately. This is presumably because the energy gap between the first and second states is as low as about 10 kcal/mol or less or about 5 kcal/mol or less to allow a shift between the first and second states with ease at the polymerization temperature.

In this regard, the energy gap can be measured by a computational chemical method using a Gaussian program or the like, as apparent to those skilled in the art. The expression that "the Lewis acid-base bond is formed in the first state" implies that the Lewis basic functional group is bound to the Lewis acidic element through a covalent bond or a coordinate bond, or comprehensively means that there occurs an interaction between the Lewis basic functional group and the Lewis acidic element caused by the Van Der Waals force or the equivalent sigmatropic rearrangement. Further, the expression that "there occurs an interaction between the Group IV transition metal and the organic functional group of the cocatalyst" means that an interaction takes place between the Group IV transition metal and the organic functional group by the Van Der Waals force or the equivalent sigmatropic rearrangement. Further, the expression that "there occurs no interaction between the metallocene catalyst and the cocatalyst in the second state" implies that the Lewis basic functional group and the Lewis acidic element do not form a Lewis acid-base bond, or means that the Group IV transition metal does not interact with the organic functional group.

However, when the metallocene catalyst and the cocatalyst take the first state, the space around the metal center of the metallocene catalyst becomes narrow due to the Lewis acid-base bond and the interaction between the Group IV transition metal and the organic functional group. Thus, ethylene or propylene rather than the relatively bulky α-olefin, in the first state, tends to gain access to the catalyst and involves polymerization. When the metallocene catalyst and the cocatalyst take the second state, the space around the metal center of the metallocene catalyst becomes wide to make the relatively bulky α-olefin monomer more accessible to the catalyst, ending up with polymerization of α-olefin at higher content.

In this manner, the specific catalyst system of the metallocene catalyst and the cocatalyst can be used to alternately take the first state involving polymerization of ethylene or propylene at a higher content and the second state involving polymerization of α-olefin at higher content. Consequently, the olefin block copolymer prepared by polymerization using the above-described catalyst composition includes a hard segment containing a relatively high mole fraction of the ethylene or propylene repeating unit, and a soft segment containing a relatively high mole fraction of the α-olefin repeating unit. In particular, the olefin block copolymer can be prepared with ease by using a simple catalyst system rather than a complicated catalyst system comprising two transition metal catalysts and thus endowed with such a high degree of blocking, dispersion characteristics, and crystal properties as described above.

In a preparation method of another exemplary embodiment, the polymerization temperature may be about 70 to 150° C., about 80 to 120° C., about 90 to 110° C., or about 90 to 100° C. Under the polymerization temperature conditions, energy shifts occur between the first and second states with ease, and the respective monomers involve polymerization reactions efficiently. It is thus possible under the polymerization temperature conditions to obtain an olefin block copolymer having a high degree of blocking and good crystal properties with high yield.

In accordance with another exemplary embodiment, a preparation method for the olefin block copolymer may use a metallocene catalyst comprising a Group IV transition metal as a metal center and a Lewis basic functional group (e.g., an oxygen-, nitrogen-, or sulfur-containing functional group having noncovalent electron pairs). If not specifically limited in the type, the metallocene catalyst may include a metallocene compound represented by the following Chemical Formula 1, in consideration of the characteristic of appropriately taking the first and second states alternately and the polymerization activity for ethylene or propylene and α-olefin in each state.

[Chemical Formula 1]

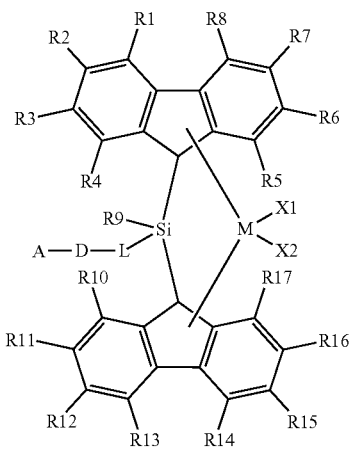

In the Chemical Formula 1, R1 to R17 are the same or different from one another and independently selected from hydrogen, halogen, $C_1$-$C_{20}$ alkyl, $C_2$-$C_{20}$ alkenyl, $C_6$-$C_{20}$ aryl, $C_7$-$C_{20}$ alkylaryl, or $C_7$-$C_{20}$ arylalkyl; L is $C_1$-$C_{10}$ linear or branched alkylene; D is —O—, —S—, or —N(R)—, wherein R is hydrogen, halogen, $C_1$-$C_{20}$ alkyl, $C_2$-$C_{20}$ alkenyl, or $C_6$-$C_{20}$ aryl; A is hydrogen, halogen, $C_1$-$C_{20}$ alkyl, $C_2$-$C_{20}$ alkenyl, $C_6$-$C_{20}$ aryl, $C_7$-$C_{20}$ alkylaryl, $C_7$-$C_{20}$ arylalkyl, $C_2$-$C_{20}$ alkoxyalkyl, $C_2$-$C_{20}$ heterocycloalkyl, or $C_5$-$C_{20}$ heteroaryl, wherein when D is —N(R)—, R is bound to A to form a nitrogen-containing heterocyclic ring such as five- to eight-membered heterocyclic rings (e.g., piperidinyl or pyrrolidinyl); M is a Group IV transition metal; and X1 and X2 are the same or different from each other and independently selected from halogen, $C_1$-$C_{20}$ alkyl, $C_2$-$C_{20}$ alkenyl, $C_6$-$C_{20}$ aryl, nitro, amido, $C_1$-$C_{20}$ alkylsilyl, $C_1$-$C_{20}$ alkoxy, or $C_0$-$C_{20}$ sulfonate.

Such a metallocene catalyst contains a functional group denoted by "A-D-" where A is bound to D (e.g., oxygen, sulfur, or nitrogen) having a noncovalent electron pair, and a Group IV transition metal as a metal center. Thus, the noncovalent electron pair contained in the "A-D-" functional group serves as a Lewis base to form an acid-base bond with the Lewis acidic element of the cocatalyst, and the Group IV transition metal M interacts with the organic functional group of the cocatalyst. As a result, the metallocene catalyst and the cocatalyst take the first and second states alternately to initiate copolymerization of ethylene or propylene with α-olefin.

Each substituent of the metallocene compound represented by the Chemical Formula 1 can be described more specifically as follows.

The $C_1$-$C_{20}$ alkyl group includes a linear or branched alkyl group. The specific examples of the alkyl group may include, but are not limited to, methyl, ethyl, propyl, isopropyl, n-butyl, tert-butyl, pentyl, hexyl, heptyl, octyl, etc.

The $C_2$-$C_{20}$ alkenyl group includes a linear or branched alkenyl group. The specific examples of the alkenyl group may include, but are not limited to, aryl, ethenyl, propenyl, butenyl, pentenyl, etc.

The $C_6$-$C_{20}$ aryl group includes a monocyclic or condensed-cyclic aryl group. The specific examples of the aryl group may include, but are not limited to, phenyl, biphenyl, naphthyl, phenanthrenyl, fluorenyl, etc.

The $C_5$-$C_{20}$ heteroaryl group includes a monocyclic or condensed-cyclic heteroaryl group. The specific examples of the heteroaryl group may include, but are not limited to, carbazolyl, pyridyl, quinoline, isoquinoline, thiophenyl, furanyl, imidazole, oxazolyl, thiazolyl, triazine, tetrahydropyranyl, tetrahydrofuranyl, etc.

The specific examples of the $C_1$-$C_{20}$ alkoxy group may include, but are not limited to, methoxy, ethoxy, phenyloxy, cyclohexyloxy, etc.

The specific examples of the Group IV transition metal may include, but are not limited to, titanium, zirconium, hafnium, etc.

With a view to ensuring the appropriate activity and characteristics of the metallocene compound of the Chemical Formula 1, R1 to R17 of the Chemical Formula 1 may be independently hydrogen, methyl, ethyl, propyl, isopropyl, n-butyl, tert-butyl, pentyl, hexyl, heptyl, octyl, or phenyl; or any one of other different substituents.

In the metallocene compound, L of the Chemical Formula 1 may be a linear or branched $C_4$-$C_8$ alkylene group. Further, the alkylene group may be unsubstituted or substituted with a $C_1$-$C_{20}$ alkyl group, a $C_2$-$C_{20}$ alkenyl group, or a $C_6$-$C_{20}$ aryl group.

In the metallocene compound, A of the Chemical Formula 1 may be hydrogen, methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, tetrahydrofuranyl, etc.; or any one of other different substituents.

The specific examples of the metallocene compound represented by the Chemical Formula 1 may include, but are not limited to, the compounds represented by the following Chemical Formula 2:

[Chemical Formula 2]

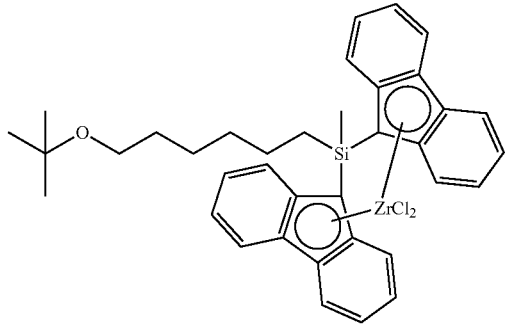

A preparation method of another exemplary embodiment may use a cocatalyst containing a Lewis acidic element (e.g., aluminum, boron, etc.) and an organic functional group, in combination with the above-described metallocene catalyst. Such a cocatalyst is not specifically limited in its type, but the representative examples of the cocatalyst may include the cocatalyst compounds represented by the following Chemical Formula 3:

—[Al(R18)—O]$_n$—     [Chemical Formula 3]

In the Chemical Formula 3, R18's are the same or different from one another and independently a $C_1$-$C_{20}$ hydrocarbon or a halogen-substituted $C_1$-$C_{20}$ hydrocarbon; and n is an integer from 2 (e.g., an integer from 2 to 6).

Such a cocatalyst contains aluminum as a Lewis acidic element and an organic functional group denoted by R18. The cocatalyst not only forms a Lewis acid-base bond properly with the metallocene catalyst of the Chemical Formula 1 but also interacts with the Group IV transition metal of the metallocene catalyst. As the energy gap between the first and second states is not so high in the case of using the metallocene catalyst of the Chemical Formula 1, the metallocene catalyst and the cocatalyst take the first and second states alternately under the above-defined copolymerization temperature conditions to initiate the copolymerization of ethylene or propylene with α-olefin. Such a cocatalyst is used in combination with, for example, the above-described metallocene catalyst of the Chemical Formula 1 to have an appropriate polymerization activity for ethylene or propylene and α-olefin. Therefore, the use of the cocatalyst together with a proper metallocene catalyst can make it easier to obtain the olefin block copolymer of the embodiment with a high degree of crystallization and a high degree of blocking.

The specific examples of the cocatalyst compound of the Chemical Formula 3 may include methyl aluminoxane, ethyl aluminoxane, isobutyl aluminoxane, butyl aluminoxane, etc., among which methyl aluminoxane is typically used.

The catalyst composition containing the metallocene catalyst and the cocatalyst can be prepared by a typical method that involves having the cocatalyst in contact with the metallocene catalyst. In the case of using an additional cocatalyst, the cocatalysts can be put in contact with the metallocene catalyst simultaneously or sequentially. Considering the interaction between the metallocene catalyst and the cocatalysts, it may be more beneficial to bring the cocatalyst of the Chemical Formula 3 containing a Lewis acidic element in contact with the metallocene catalyst prior to the other cocatalyst.

The molar ratio of the metallocene catalyst to the cocatalyst may be in the range of about 1/5,000 to 1/2, about 1/1,000 to 1/10, or about 1/500 to 1/20. Using the metallocene catalyst and the cocatalyst within the defined range of molar ratio not only ensures an appropriate interaction between the metallocene catalyst and the cocatalyst but prevents a deterioration of the activity of the metallocene catalyst caused by an excess of the cocatalyst and a rise of the unit cost of the process.

In the preparation of the catalyst composition, there may be used a solvent, including an aliphatic hydrocarbon solvent (e.g., pentane, hexane, heptane, etc.) or an aromatic hydrocarbon solvent (e.g., benzene, toluene, etc.). Further, the metallocene catalyst or the cocatalyst may be supported on a catalyst support such as silica, alumina, or the like.

In the preparation of the block copolymer of the embodiment, an olefin block copolymer can be prepared by a method that includes the step of copolymerizing an ethylene or propylene monomer with an α-olefin monomer in the presence of the above-described catalyst composition containing the metallocene catalyst and the cocatalyst. In this regard, the α-olefin may include at least one selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

A preparation method of an olefin block copolymer according to another embodiment may be carried out under the typical conditions for the preparation of olefin copolymers except for those specified above. Specific examples of the copolymerization conditions are described in the aftermentioned Examples.

Hereinafter, some examples will be given for better understanding of the present description, but the following examples are presented only for a mere illustration though, and the scope of the present description should not be construed to be defined thereby.

Preparation Example 1

1) Preparation of Ligand Compound

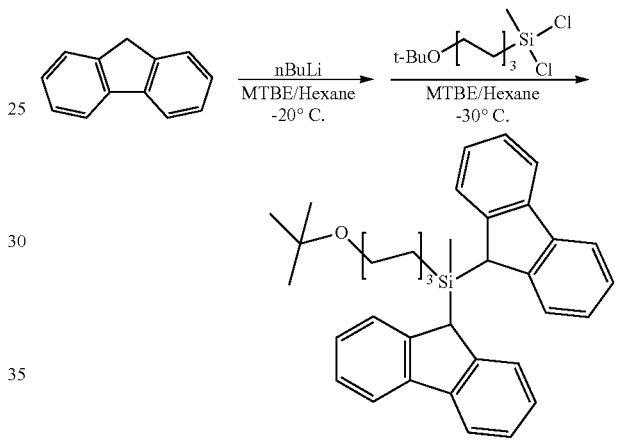

1.0 mol of a tert-Bu—O—(CH$_2$)$_6$MgCl solution was obtained as a Grignard reagent through a reaction of tert-Bu—O—(CH$_2$)$_6$Cl and Mg(O) in THF solvent. The Grignard reagent thus obtained was added into a flask containing a MeSiCl$_3$ compound (176.1 mL, 1.5 mol) and THF (2.0 L) at −30° C., and the resultant solution was stirred at the room temperature for 8 hours or longer and then subjected to filtration. The filtrate was dried under vacuum to obtain a compound of tert-Bu—O—(CH$_2$)$_6$SiMeCl$_2$ (92% yield).

Fluorene (3.33 g, 20 mmol), hexane (100 mL), and methyl tert-butyl ether (MTBE) (1.2 mL, 10 mmol) were placed in a reactor at −20° C. 8 mL of n-BuLI (2.5 M, in hexane) was slowly added to the reactor, which was then agitated at the room temperature for 6 hours. After completion of the agitation, the reactor was cooled down to −30° C. Then, the fluorenyl lithium solution prepared above was slowly added to a solution of tert-Bu—O—(CH$_2$)$_6$SiMeCl$_2$ (2.7 g, 10 mmol) dissolved in hexane (100 mL) at −30° C. for one hour. After agitation at the room temperature for 8 hours or longer, the resultant solution was subjected to extraction with an addition of water and then evaporation to obtain (tert-Bu—O—(CH$_2$)$_6$MeSi(9-C$_{13}$H$_{10}$)$_2$ (5.3 g, 100% yield). The structure of the ligand compound was identified through $^1$H-NMR.

$^1$H NMR (500 MHz, CDCl$_3$): −0.35 (MeSi, 3H, s), 0.26 (Si—CH$_2$, 2H, m), 0.58 (CH$_2$, 2H, m), 0.95 (CH$_2$, 4H, m), 1.17 (tert-BuO, 9H, s), 1.29 (CH$_2$, 2H, m), 3.21 (tert-BuO-CH$_2$, 2H, t), 4.10 (Flu-9H, 2H, s), 7.25 (Flu-H, 4H, m), 7.35 (Flu-H, 4H, m), 7.40 (Flu-H, 4H, m), 7.85 (Flu-H, 4H, d).

2) Preparation of Metallocene Compound

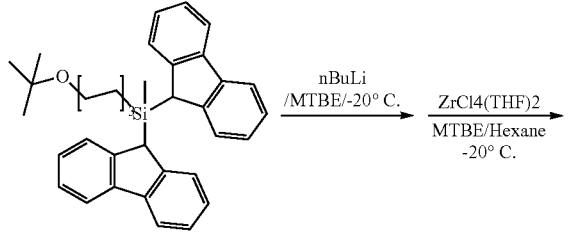

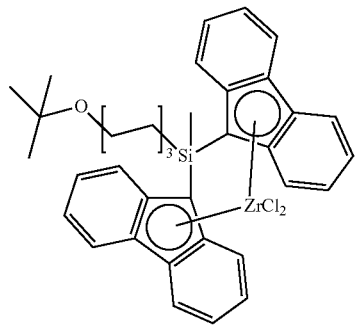

At −20° C., 4.8 mol of n-BuLi (2.5 M in hexane) was slowly added to a solution of (tert-Bu—O—(CH$_2$)$_6$MeSi(9-C$_{13}$H$_{10}$)$_2$ (3.18 g, 6 mmol)/MTBE (20 mL). Heated up to the room temperature, the mixture was allowed to react for 8 hours or longer. The slurry solution of dilithium salt thus obtained was slowly added to a slurry solution of ZrCl$_4$(THF)$_2$ (2.26 g, 6 mmol)/hexane (20 mL) at −20° C., and the resulting mixture was allowed to react at the room temperature for 8 more hours or longer. The precipitate thus obtained was filtered out and washed with hexane several times to obtain (tert-Bu—O—(CH$_2$)$_6$MeSi(9-C$_{13}$H$_9$)$_2$ZrCl$_2$ as a red solid (4.3 g, 94.5% yield).

$^1$H NMR (500 MHz, C6D6): 1.15 (tert-BuO, 9H, s), 1.26 (MeSi, 3H, s), 1.58 (Si—CH2, 2H, m), 1.66 (CH2, 4H, m), 1.91 (CH2, 4H, m), 3.32 (tert-BuO-CH2, 2H, t), 6.86 (Flu-H, 2H, t), 6.90 (Flu-H, 2H, t), 7.15 (Flu-H, 4H, m), 7.60 (Flu-H, 4H, dd), 7.64 (Flu-H, 2H, d), 7.77 (Flu-H, 2H, d)

Preparation Example 2

1) Preparation of Ligand Compound

The procedures were performed in the same manner as described in Preparation Example 1, excepting that tert-Bu—O—(CH$_2$)$_4$Cl was used in place of tert-Bu—O—(CH$_2$)$_6$Cl to prepare (tert-Bu—O—(CH$_2$)$_4$MeSi(9-C$_{13}$H$_{10}$)$_2$ as a ligand compound with almost the same yield as acquired in Preparation Example 1. The structure of the ligand compound was identified through $^1$H-NMR.

$^1$H NMR (500 MHz, C6D6): −0.40 (MeSi, 3H, s), 0.30 (CH$_2$, 2H, m), 0.71 (CH$_2$, 2H, m), 1.05 (tert-BuO, 9H, s), 1.20 (CH$_2$, 2H, m), 2.94 (tert-BuO-CH$_2$, 2H, t), 4.10 (Flu-9H, 2H, s), 7.16 (Flu-H, 4H, m), 7.35 (Flu-H, 4H, m), 7.35 (Flu-H, 2H, d), 7.43 (Flu-H, 2H, d), 7.77 (Flu-H, 4H, d).

2) Preparation of Metallocene Compound

The procedures were performed in the same manner as described in Preparation Example 1, excepting that (tert-Bu—O—(CH$_2$)$_4$MeSi(9-C$_{13}$H$_{10}$)$_2$ was used in place of (tert-Bu—O—(CH$_2$)$_6$MeSi(9-C$_{13}$H$_{10}$)$_2$ to prepare (tert-Bu—O—(CH$_2$)$_4$MeSi(9-C$_{13}$H$_9$)$_2$ZrCl$_2$ with almost the same yield.

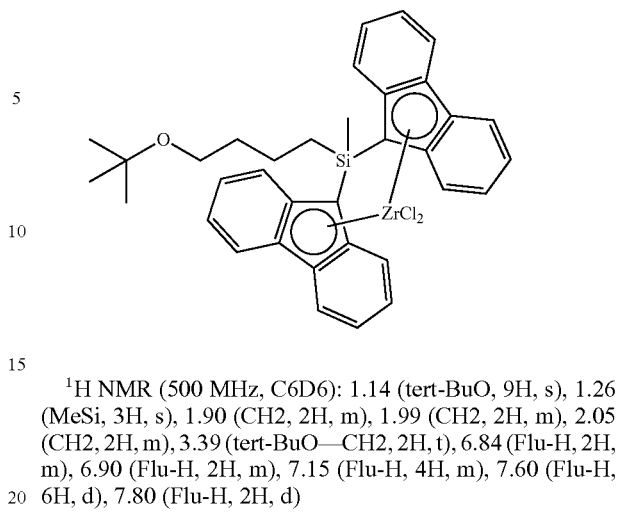

$^1$H NMR (500 MHz, C6D6): 1.14 (tert-BuO, 9H, s), 1.26 (MeSi, 3H, s), 1.90 (CH2, 2H, m), 1.99 (CH2, 2H, m), 2.05 (CH2, 2H, m), 3.39 (tert-BuO—CH2, 2H, t), 6.84 (Flu-H, 2H, m), 6.90 (Flu-H, 2H, m), 7.15 (Flu-H, 4H, m), 7.60 (Flu-H, 6H, d), 7.80 (Flu-H, 2H, d)

Preparation Example 3

1) Preparation of Ligand Compound

The procedures were performed in the same manner as described in Preparation Example 1, excepting that tert-Bu—O—(CH$_2$)$_8$Cl was used in place of tert-Bu—O—(CH$_2$)$_6$Cl to prepare (tert-Bu—O—(CH$_2$)$_8$MeSi(9-C$_{13}$H$_{10}$)$_2$ as a ligand compound with almost the same yield as acquired in Preparation Example 1. The structure of the ligand compound was identified through $^1$H-NMR.

$^1$H NMR (500 MHz, C6D6): −0.40 (MeSi, 3H, s), 0.29 (CH$_2$, 2H, m), 0.58 (CH$_2$, 2H, m), 0.83 (CH$_2$, 2H, m), 0.95 (CH$_2$, 2H, m), 1.05 (CH$_2$, 2H, m), 1.14 (tert-BuO, 9H, s), 1.30 (CH$_2$, 2H, m), 1.64 (CH$_2$, 2H, m), 3.27 (tert-BuO—CH2, 2H, t), 4.13 (Flu-9H, 2H, s), 7.17 (Flu-H, 4H, m), 7.26 (Flu-H, 4H, m), 7.37 (Flu-H, 2H, d), 7.43 (Flu-H, 2H, d), 7.78 (Flu-H, 4H, d).

2) Preparation of Metallocene Compound

The procedures were performed in the same manner as described in Preparation Example 1, excepting that (tert-Bu—O—(CH$_2$)$_8$MeSi(9-C$_{13}$H$_{10}$)$_2$ was used in place of (tert-Bu—O—(CH$_2$)$_6$MeSi(9-C$_{13}$H$_{10}$)$_2$ to prepare (tert-Bu—O—(CH$_2$)$_8$MeSi(9-C$_{13}$H$_9$)$_2$ZrCl$_2$ with almost the same yield.

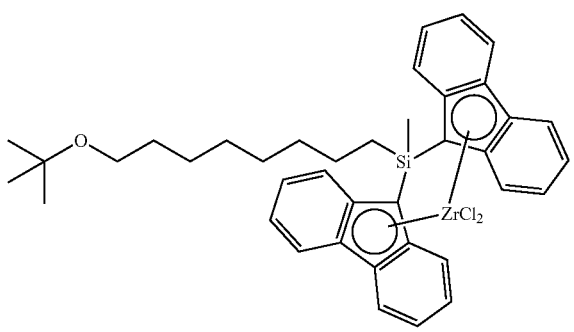

$^1$H NMR (500 MHz, C6D6): 1.17 (tert-BuO, 9H, s), 1.29 (MeSi, 3H, s), 1.41 (CH2, 4H, m), 1.49 (CH2, 2H, m), 1.64 (CH2, 2H, m), 1.89 (CH2, 4H, m), 1.94 (CH2, 2H, m), 3.30 (tert-BuO—CH2, 2H, t), 6.81 (Flu-H, 2H, m), 6.90 (Flu-H, 2H, m), 7.14 (Flu-H, 4H, m), 7.60 (Flu-H, 4H, d), 7.65 (Flu-H, 2H, d), 7.78 (Flu-H, 2H, d)

Comparative Example 1

1) Preparation of Ligand Compound 1,2,3,4-tetrahydroquinoline (957 mg, 7.185 mmol) was dissolved in THF (10 mL), and the resultant solution was stirred at −78° C. for 30 minutes. Then, n-BuLi (2.87 mL, 7.185 mmol) was added with a syringe in the nitrogen atmosphere. The resultant solution was heated up to the room temperature and stirred sufficiently for 3 hours. The solution was cooled down to −78° C. again, and $CO_2$ gas was added to initiate a reaction. The solution was heated up to the room temperature and stirred to eliminate the remaining $CO_2$ gas. Tert-butyl lithium (BuLi) (5.07 mL, 8.622 mmol) was added at −20° C. After sufficient 2-hour agitation still at −20° C., a 0.33 M solution of $CeCl_3 \cdot 2LiCl$ (26.1 mL, 8.622 mmol) in THF and tetramethyl cyclopentenone (1.182 g, 8.622 mmol) were added in the nitrogen atmosphere. While slowly heated up to the room temperature, the resultant solution was vented, removed of the solvent, and then subjected to extraction with water and ethyl acetate. The organic phase thus formed was separated and removed of the solvent. Then, 8-(2,3,4,5-tetramethyl-1,3-cyclopentadienyl)-1,2,3,4-tetrahydroquinoline was obtained through column chromatography (41% yield).

$^1$H NMR (500 MHz, C6D6): δ 1.00 (br d, 3H, Cp-CH3), 1.63-1.73 (m, 2H, quin-CH2), 1.80 (s, 3H, Cp-CH3), 1.81 (s, 3H, Cp-CH3), 1.85 (s, 3H, Cp-CH3), 2.64 (t, J=6.0 Hz, 2H, quin-CH2), 2.84-2.90 (br, 2H, quin-CH2), 3.06 (br s, 1H, Cp-H), 3.76 (br s, 1H, N—H), 6.77 (t, J=7.2 Hz, 1H, quin-CH), 6.92 (d, J=2.4 Hz, 1H, quin-CH), 6.94 (d, J=2.4 Hz, 1H, quin-CH) ppm.

2) Preparation of Metallocene Compound 8-(2,3,4,5-tetramethyl-1,3-cyclopentadienyl)-1,2,3,4-tetrahydroquinoline (1 g, 3.95 mmol) prepared above was dissolved in toluene and cooled down to −20° C. To the resultant solution was slowly added a 2.5 M solution of n-butyl lithium (3.2 mL, in hexane). After heated up to the room temperature, the solution was stirred for 3 hours or longer and cooled down to −20° C. again. Then, a slurry solution of (diethoxyethane) titanium (IV) tetrachloride (1.10 g, 3.95 mmol) in toluene was added, and the resultant solution was heated up to the room temperature and stirred for 12 hours or longer to initiate a reaction. The resultant solution was removed of the solvent under reduced pressure. After addition of hexane, the solution was stirred and subjected to filtration. The solid compound thus filtered out was washed with hexane and dried under reduced pressure to obtain [η5, η1:1-(1,2,3,4-tetrahydroquinoline-8-yl)-2,3,4,5-tetramethylcyclopentadienyl]titanium (IV) dichloride.

$^1$H NMR (500 MHz, C6D6): δ 1.40 (m, 2H, quin-CH2), 1.78 (s, 6H, Cp-CH3), 2.03 (s, 6H, Cp-CH3), 2.15 (t, 2H, quin-CH2), 4.50 (m, 2H, quin-CH2), 6.80 (d, 1H, quin-CH), 6.91 (t, 1H, quin-CH), 6.97 (d, 1H, quin-CH) ppm.

Examples 1 to 8

Into a 500 mL glass reactor were sequentially added toluene, 1-hexene or 1-octene, and a solution containing 10 wt. % of methyl aluminoxane (MAO) in toluene. Subsequently, a 1 mM toluene solution of the compound of the Preparation Example 1 (i.e., (tert-Bu—O—$(CH_2)_6$MeSi(9-$C_{13}H_9$)$_2$ $ZrCl_2$) and then ethylene were added into the reactor to initiate a polymerization reaction. The reactants were stirred for a predetermined period of time and, after ventilation, poured into an ethanol/HCl solution. After stirring and filtration, the resultant solution was washed with ethanol and removed of the solvent through evaporation to obtain an olefin block copolymer.

In the respective Examples, olefin block copolymers were prepared while varying the content of the 1-hexene or 1-octene monomer in the entire content of monomers including a 1-hexene or 1-octene monomer and an ethylene monomer.

Comparative Example 1

An olefin-based elastomer, LUCENE™ LC170 supplied by LG Chem. Ltd. was used as the Comparative Example 1.

Comparative Examples 2 to 16

Into a 500 mL glass reactor were sequentially added toluene, 1-octene, and a solution containing 10 wt. % of methyl aluminoxane (MAO) in toluene. Subsequently, a 1 mM toluene solution of the compound of Comparative Preparation Example 1 (i.e., 1-(1,2,3,4-tetrahydroquinoline-8-yl)-2,3,4,5-tetramethylcyclopentadienyl] Ti(IV)$Cl_2$) and then ethylene were added into the reactor to initiate a polymerization reaction. The reactants were stirred for a predetermined period of time and, after ventilation, poured into an ethanol/HCl solution. After stirring and filtration, the resultant solution was washed with ethanol and removed of the solvent through evaporation to obtain a copolymer of each Comparative Example.

In the Comparative Examples 2 to 16, the respective copolymers were prepared while varying the content of the 1-octene monomer in the entire content of monomers including a 1-octene monomer and an ethylene monomer.

The ethylene-α-olefin (1-hexene or 1-octene) copolymers prepared in the Examples 1 to 8 and Comparative Examples 1 to 16 were evaluated in regards to properties according to the methods as described in the following Experimental Example.

Experimental Example

1) TEM Image Analysis

Each copolymer of Examples 1 to 8 and Comparative Examples 1 to 16 was melted at 220° C. for 3 minutes with a micro-injection molding system (Haake Minijet II manufactured by Thermo Electron Ltd.), molded with a rectangular bar type mold at 40° C. by injection under 40 bar and, after 30 seconds, aged under 250 bar for 60 seconds to obtain a sample in the form of a rectangular bar (64 mm×12.7 mm×3.2 mm). After cryo-microtome, the sample was vapor-stained with a 1M aqueous solution of $MgSO_4$ for one hour and then used for TEM (Reference: *Microscopy and Microanalysis* 14, 126-137 pages, 2008).

Figure 2:
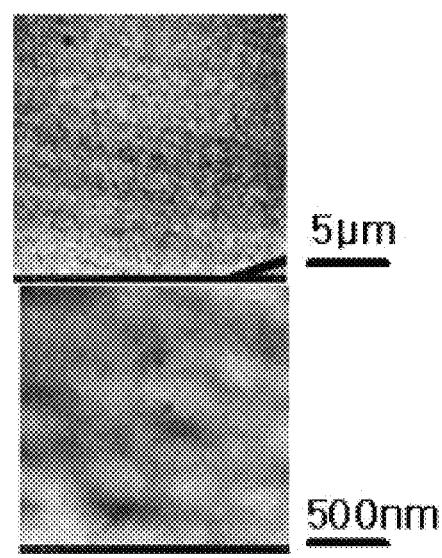
FIG. 2 shows TEM images of a copolymer according to Comparative Example 1, where the lower image is an enlargement of the copolymer shown in the upper image.

The TEM images of the copolymers of Example 3 and Comparative Example 1 are shown in FIGS. 1 and 2, respectively. Further, the TEM images for Examples 1 to 8 and Comparative Examples 1 to 16 were analyzed to determine the existence of a dispersed phase shaped like a closed curve and, if any, the diameter of the dispersed phase. The analytical results are presented in Table 1. The diameter of the dispersed phase was determined as the average of the diameter measurement values for approximately 10 dispersed phases shaped in a closed curve on each TEM image.

2) Analysis on the Content of Ethylene Repeating Unit $^1$H-NMR was used to analyze the content of the ethylene repeating unit in each of the copolymers prepared in the Examples 1 to 8 and Comparative Examples 1 to 16. More specifically, the peaks for the methyl groups appearing at around 0.9 ppm were quantitatively analyzed to calculate the content of the ethylene repeating unit.

3) Analysis on the Content of Hard Segment

Figure 3:
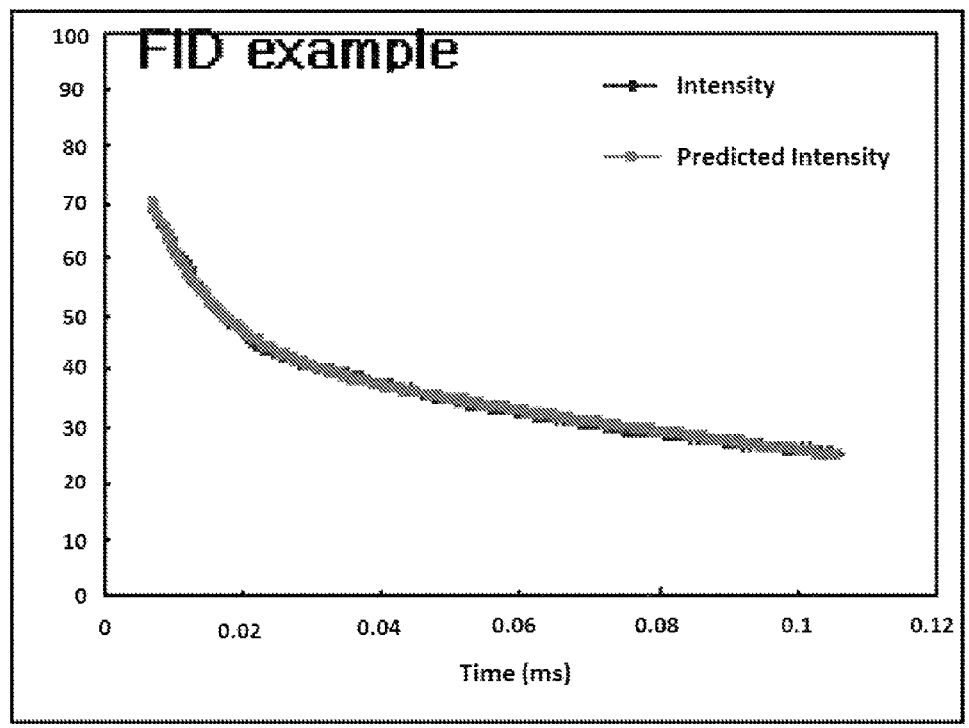
FIG. 3 illustrates an example of FID (Free Induction Decay) elicited to measure the mole fraction (mol. %) of the hard segment contained in the olefin block copolymer in Experimental Example.

The content (mole fraction) of the hard segment in each copolymer of Examples 1 to 8 and Comparative Examples 1 to 16 was calculated using the time domain NMR instrument (TD NMR; Minspec™ manufactured by Bruker Optics) commercially available. Firstly, the TD NMR instrument was adopted to measure the FDI (Free Induction Decay) for the samples of the Examples and the Comparative Examples. The measurement results were as depicted, for example, in FIG. 3. As shown in FIG. 3, FID is the function of time and intensity. The four constants, A, B, $T2_{fast}$, and $T2_{slow}$, in the following Mathematical Formula 2 were varied to elicit a functional formula most approximating the FID functional graph, thereby determining A, B, $T2_{fast}$, and $T2_{slow}$ values for each sample.

It is known that the T2 (spin-spin relaxation time) relaxation for the hard segment as calculated from the functional formula appears fast, while the T2 relaxation for the soft segment is slow. Hence, among the calculated values of A, B, $T2_{fast}$, and $T2_{slow}$, the lower T2 value was determined as the T2 value of the hard segment, that is, $T2_{fast}$, while the higher T2 value was determined as the T2 value of the soft segment, that is, $T2_{slow}$. Through this procedure, the content (mol. %) of the hard segment as well as the constants A and B was calculated. The results of calculation for Examples 1 to 8 and Comparative Examples 1 to 16 are presented in Table 1.

$$\text{Intensity}=A \times \text{EXP}(-\text{Time}/T2_{fast})+B \times \text{EXP}(-\text{Time}/T2_{slow}) \quad \text{[Mathematical Formula 2]}$$

Determine A, B, $T2_{fast}$, and $T2_{slow}$ by fitting.

Hard segment(mol. %)=A/(A+B)×100

In the Mathematical Formula 2, intensity and time are values calculated through the FID analysis; $T2_{fast}$ is the T2 (spin-spin relaxation time) relaxation value for the hard segment; and $T2_{slow}$ is the T2 (spin-spin relaxation time) relaxation value for the soft segment. A and B, which are constants determined by the fitting process, indicate the relative proportions of the hard and soft segments, respectively, and have values proportionate to the contents of the respective segments.

Figure 4:
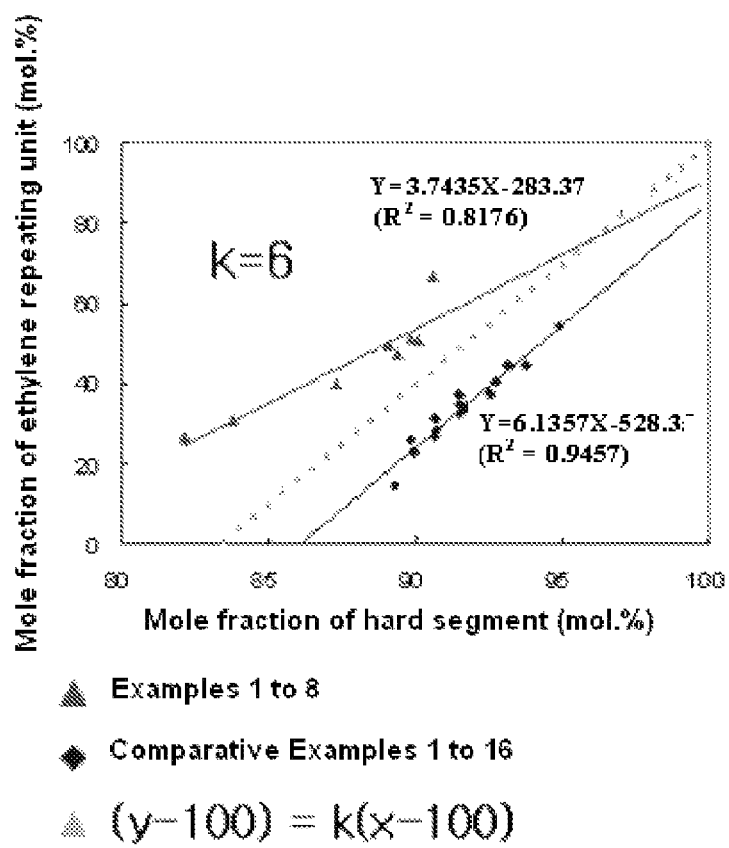
FIG. 4 is a linear regression graph showing the relationship between the mole fraction Y (mol. %) of the hard segment and the mole fraction X (mol. %) of the ethylene repeating unit contained in the olefin block copolymers of Examples in comparison with the copolymers of Comparative Examples in the Experimental Example.

4) Determination of Relational Expression Between Mole Fraction Y (Mol. %) of Hard Segment and Mole Fraction X (Mol. %) of Ethylene Repeating Unit According to the above-described method, the mole fraction Y (mol. %) of the hard segment and the mole fraction X (mol. %) of the ethylene repeating unit in the block copolymer were respectively calculated, and the mole fraction Y (mol. %) of the hard segment as a function of the mole fraction X (mol. %) of the ethylene repeating unit was then determined. Those data were applied to the linear regression analysis to obtain the relational expression between them in the form of a linear function. Such a linear function led to the respective equations as given by Y=3.7435X−283.37 ($R^2$=0.8176) and Y=6.1357X−528.35 ($R^2$=0.9457), respectively, for the Examples 1 to 8 and the Comparative Examples 1 to 16. The results are depicted in FIG. 4.

This shows that the content of the ethylene repeating unit in the copolymers of the Examples was about 98 mo. % or less, satisfying the relationship of the Mathematical Formula 1 as given by "(Y−100)≥6(X−100)" in the region where the block copolymer can become an olefin-based elastomer. Contrarily, the copolymers of the Comparative Examples 2 to 16 hardly satisfied the Mathematical Formula 1. In addition, the copolymers of the Examples had a considerably high content of the hard segment even with the same content of the ethylene repeating unit, so they had a very high degree of blocking of hard and soft segments.

5) Density

Each sample in the form of a rectangular bar (64 mm×12.7 mm×3.2 mm) obtained for the TEM analysis was measured in regards to density with a Mettler scale. The density measurements are presented in Table 1.

6) Melting Temperature Tm and Crystallization Temperature Tc

While the temperature maintained in equilibration at 30° C., each copolymer sample was heated up to 200° C. at a rate of 20° C./min and kept at the same temperature to remove its thermal history. Then, the sample was cooled down to 10° C. at a rate of 10° C./min to analyze the exothermic peak corresponding to the crystallization temperature. The copolymer sample was kept at 10° C. for one minute, heated up to 200° C. at a rate of 10° C./min, kept at 200° C. for one minute, and then cooled down to 30° C. to complete the experiment.

According to the measurement results of DSC (Differential Scanning calorimeter, DSC2920 manufactured by TA instruments), the top of the 10° C./min cooling interval in the temperature-depending heat flow curve was determined as the crystallization temperature Tc. In the 10° C./min heating interval, the wider one of the peaks was picked up as a first peak, the narrower one as a second peak. In this regard, the heating/cooling rate was 10° C./min, and the temperature measurement obtained in the second heating interval was determined as the melting temperature Tm. The melting temperature and the crystallization temperature thus determined are presented in Table 2.

7) PDI (PolyDispersity Index): Molecular Weight and Molecular Weight Distribution GPC (Gel Permeation Chromatography) was adopted to measure the number average molecular weight (Mn) and the weight average molecular weight (Mw). Then, the weight average molecular weight was divided by the number average molecular weight to determine the molecular weight distribution. The weight average molecular weight and the molecular weight distribution are presented in Table 2.

The respective properties measured by the above-described methods are presented in Tables 1 and 2 as follows.

TABLE 1

| Sample | Existence of closed curve of dispersed phase on TEM image | Diameter of closed curve (average: μm) | α-olefin used in copolymerization | Mole fraction (mol. %) of ethylene repeating unit in copolymer | Hard segment content (mol. %) | Density(g/cm³) |
|---|---|---|---|---|---|---|
| Example 1 | ◯ | 0.63 | 1-Hexene | 82.1 | 26.6 | 0.865 |
| Example 2 | ◯ | 0.68 | 1-Hexene | 85.0 | 30.9 | 0.868 |
| Example 3 | ◯ | 0.58 | 1-Hexene | 87.3 | 39.9 | 0.876 |
| Example 4 | ◯ | 0.62 | 1-Octene | 89.1 | 49.5 | No measurement |
| Example 5 | ◯ | 0.64 | 1-Hexene | 89.4 | 47.5 | 0.885 |

TABLE 1-continued

| Sample | Existence of closed curve of dispersed phase on TEM image | Diameter of closed curve (average: μm) | α-olefin used in copolymerization | Mole fraction (mol. %) of ethylene repeating unit in copolymer | Hard segment content (mol. %) | Density(g/cm$^3$) |
|---|---|---|---|---|---|---|
| Example 6 | ○ | 0.52 | 1-Octene | 89.9 | 51.2 | No measurement |
| Example 7 | ○ | 0.55 | 1-Hexene | 90.1 | 50.8 | 0.886 |
| Example 8 | ○ | 0.47 | 1-Hexene | 90.6 | 66.5 | 0.892 |
| Comparative Example 1 | X | — | 1-Octene | 88.0 | No measurement | 0.873 |
| Comparative Example 2 | X | — | 1-Octene | 89.3 | 14.8 | 0.869 |
| Comparative Example 3 | X | — | 1-Octene | 89.9 | 25.8 | No measurement |
| Comparative Example 4 | X | — | 1-Octene | 89.9 | 22.9 | No measurement |
| Comparative Example 5 | X | — | 1-Octene | 90.7 | 26.9 | 0.873 |
| Comparative Example 6 | X | — | 1-Octene | 90.7 | 28.1 | No measurement |
| Comparative Example 7 | X | — | 1-Octene | 90.7 | 31.2 | No measurement |
| Comparative Example 8 | X | — | 1-Octene | 91.5 | 37.1 | No measurement |
| Comparative Example 9 | X | — | 1-Octene | 91.5 | 32.6 | No measurement |
| Comparative Example 10 | X | — | 1-Octene | 91.5 | 34.5 | No measurement |
| Comparative Example 11 | X | — | 1-Octene | 91.8 | 34.1 | No measurement |
| Comparative Example 12 | X | — | 1-Octene | 92.5 | 37.4 | 0.875 |
| Comparative Example 13 | X | — | 1-Octene | 92.8 | 40.6 | No measurement |
| Comparative Example 14 | X | — | 1-Octene | 93.2 | 44.2 | 0.882 |
| Comparative Example 15 | X | — | 1-Octene | 93.8 | 44.2 | 0.889 |
| Comparative Example 16 | X | — | 1-Octene | 94.9 | 54.5 | 0.895 |

Note:
The mole fraction of the hard segment was not measured for Comparative Examples; and the density was not measured for some of the Examples and Comparative Examples.

TABLE 2

| Sample | Tm (° C.) | Tc (° C.) | Mw | Molecular weight distribution |
|---|---|---|---|---|
| Example 1 | 118 | 104.3 | 75200 | 3.2 |
| Example 2 | 119 | 105.1 | 98200 | 2.7 |
| Example 3 | 120 | 105.0 | 99800 | 3.2 |
| Example 4 | 118 | 105.1 | 99800 | 3.5 |
| Example 5 | 120 | 104.3 | 129400 | 3.0 |
| Example 6 | 119 | 104.9 | 98300 | 3.7 |
| Example 7 | 118 | 103.5 | 138000 | 3.1 |
| Example 8 | 123 | 107.2 | No measurement | No measurement |
| Comparative Example 1 | 56.0 | 59.0 | 99700 | 2.5 |
| Comparative Example 2 | 62.3 | 64.6 | 77300 | 2.5 |
| Comparative Example 5 | 65.1 | 68.0 | 80500 | 2.6 |
| Comparative Example 12 | 67.3 | 69.9 | 84600 | 2.7 |
| Comparative Example 14 | 70.4 | 72.6 | 88800 | 2.7 |
| Comparative Example 15 | 72.1 | 76.2 | 89400 | 2.7 |
| Comparative Example 16 | 75.7 | 79.0 | 98400 | 2.8 |

Note)
The weight average molecular weight and the molecular weight distribution were not measured for Example 8.

Referring to Tables 1 and 2, the block copolymers of the Examples were dyed with magnesium sulfate to show that the soft segment in dark color was uniformly dispersed on the hard segment in light color. Referring to the lower image of FIG. 1, the dispersed phase of the soft segment is shaped in the form of a closed curve similar to an oval. Further, the dispersed phase shaped in a closed curve had a diameter of about 0.3 to 2.0 μm.

In contrast, referring to the TEM images of FIG. 2, the copolymers of the Comparative Examples did not have such a dispersion characteristic as shown in the Examples. Neither a dispersed phase shaped in a closed curve nor a plurality of segments distinguishable from one another appeared on the TEM images.

Referring to Table 1 and FIG. 4, the block copolymers of the Examples had a relatively high mole fraction of the hard segment even with similar levels in the mole fraction of the ethylene repeating unit and the density, showing a relatively high degree of blocking, with respect to the block copolymers of the Comparative Examples.

Further, the block copolymers of the Examples with such novel characteristics had a relatively high melting temperature and good heat resistance in relation to the block copolymers of the Comparative Examples. The block copolymers of the Examples had a relatively high crystallization temperature as well. This shows that the block copolymers of the Examples have a high crystallization rate during the melt processing to secure superiority in processability and product formability to the block copolymers of the Comparative Examples.

In addition, the block copolymers of the Examples had a defined level of density pertaining to block copolymerization using a predetermined amount of α-olefin to ensure excellent elasticity as an elastomer.

What is claimed is:

1. An olefin block copolymer comprising hard and soft segments, each comprising an ethylene or propylene repeating unit and a $C_4$ or more α-olefin repeating unit at different mole fractions,
   wherein the soft segment is dispersed in the form of a closed curve as a dispersed phase on the hard segment according to a TEM (Transmission Electron Microscope) image, and
   wherein the form of the closed curve is circular or elliptical.

2. The olefin block copolymer as claimed in claim 1, wherein the dispersed phase of the soft segment shaped in the form of a closed curve has a diameter of 0.3 to 2.0 μM.

3. The olefin block copolymer as claimed in claim 1, wherein the hard segment comprises a first mole fraction of the $C_4$ or more α-olefin repeating unit, and the soft segment comprises a second mole fraction of the $C_4$ or more α-olefin repeating unit,
   wherein the second mole fraction is greater than the first mole fraction.

4. The olefin block copolymer as claimed in claim 3, wherein the mole fraction of the $C_4$ or more α-olefin repeating unit contained in the entire block copolymer has a value between the first and second mole fractions.

5. The olefin block copolymer as claimed in claim 1, wherein the olefin block copolymer comprises 80 to 98 mol. % of the ethylene or propylene repeating unit.

6. The olefin block copolymer as claimed in claim 3, wherein the olefin block copolymer comprises 20 to 90 mol. % of the hard segment and 10 to 80 mol. % of the soft segment.

7. The olefin block copolymer as claimed in claim 1, wherein the olefin block copolymer has a crystallization temperature Tc of 95 to 120° C.

8. The olefin block copolymer as claimed in claim 1, wherein the olefin block copolymer has a melting temperature Tm of 110 to 135° C.

9. The olefin block copolymer as claimed in claim 1, wherein the olefin block copolymer has a density of 0.85 to 0.92 g/cm$^3$.

10. The olefin block copolymer as claimed in claim 1, wherein the olefin block copolymer has a weight average molecular weight of 5,000 to 3,000,000 and a molecular weight distribution of 2.5 or more.

11. The olefin block copolymer as claimed in claim 1, wherein the $C_4$ or more α-olefin repeating unit is a repeating unit derived from at least one $C_4$ or more α-olefin selected from the group consisting of 1-butene, 1-pentene, 4-methyl-1-pentene, 1-hexene, 1-heptene, 1-octene, 1-decene, 1-undecene, 1-dodecene, 1-tetradecene, and 1-hexadecene.

* * * * *